United States Patent
Sato et al.

(10) Patent No.: US 12,508,790 B2
(45) Date of Patent: Dec. 30, 2025

(54) HOSE FOR FLUID TRANSPORTATION

(71) Applicant: The Yokohama Rubber Co., LTD., Kanagawa (JP)

(72) Inventors: Shun Sato, Kanagawa (JP); Daisuke Maeda, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 327 days.

(21) Appl. No.: 18/264,375

(22) PCT Filed: Jan. 20, 2022

(86) PCT No.: PCT/JP2022/002061
§ 371 (c)(1),
(2) Date: Aug. 4, 2023

(87) PCT Pub. No.: WO2022/172723
PCT Pub. Date: Aug. 18, 2022

(65) Prior Publication Data
US 2024/0100802 A1    Mar. 28, 2024

(30) Foreign Application Priority Data
Feb. 10, 2021   (JP) ................. 2021-020142

(51) Int. Cl.
*B32B 1/08* (2006.01)
*B32B 15/02* (2006.01)
*B32B 15/082* (2006.01)
*B32B 15/088* (2006.01)
*B32B 15/09* (2006.01)
*B32B 15/14* (2006.01)
*B32B 15/18* (2006.01)

(52) U.S. Cl.
CPC .............. *B32B 1/08* (2013.01); *B32B 15/02* (2013.01); *B32B 15/082* (2013.01); *B32B 15/088* (2013.01); *B32B 15/09* (2013.01); *B32B 15/14* (2013.01); *B32B 15/18* (2013.01); *B32B 2262/103* (2013.01); *B32B 2305/08* (2013.01); *B32B 2307/54* (2013.01); *B32B 2307/724* (2013.01); *B32B 2311/30* (2013.01); *B32B 2597/00* (2013.01)

(58) Field of Classification Search
None
See application file for complete search history.

(56) References Cited

U.S. PATENT DOCUMENTS

| | | | |
|---|---|---|---|
| 5,910,544 A * | 6/1999 | Ozawa | C08L 23/28 525/178 |
| 6,062,283 A | 5/2000 | Watanabe et al. | |
| 8,227,061 B2 * | 7/2012 | Noda | B32B 25/04 428/36.1 |
| 11,054,066 B2 * | 7/2021 | Terada | C08K 3/04 |
| 2005/0199308 A1 | 9/2005 | Swails | |
| 2019/0375182 A1 | 12/2019 | Kanesugi et al. | |
| 2020/0080668 A1 | 3/2020 | Haines et al. | |
| 2021/0347972 A1 | 11/2021 | Sato et al. | |

FOREIGN PATENT DOCUMENTS

| | | |
|---|---|---|
| JP | 9-314752 A | 12/1997 |
| JP | 2020-45470 A | 3/2020 |
| WO | 2018/155491 A1 | 8/2018 |
| WO | 2020/003089 A1 | 1/2020 |

* cited by examiner

*Primary Examiner* — Yan Lan
(74) *Attorney, Agent, or Firm* — Thorpe North & Western

(57) ABSTRACT

A fluid transport hose includes an inner layer including a thermoplastic resin composition containing a thermoplastic resin and an elastomer, a reinforcing layer disposed on an outer side of the inner layer, and an outer layer disposed on an outer side of the reinforcing layer, the thermoplastic resin composition having a storage modulus $E'_L$ at $-40°$ C. and a storage modulus $E'_H$ at $80°$ C. satisfying Formulas (1), (2), and (3): $E'_L \le 1500$ MPa ... (1), $E'_H \ge 40$ MPa ... (2), $E'_H/E'_L \ge 0.05$ ... (3).

18 Claims, No Drawings

HOSE FOR FLUID TRANSPORTATION

TECHNICAL FIELD

The present technology relates to a fluid transport hose.

BACKGROUND ART

There is known a hydrogen transport component including a hydrogen gas barrier layer including a resin composition containing polyamide 11 and a modified olefin elastomer, a reinforcing layer disposed outside the hydrogen gas barrier layer, and an outer covering layer containing a polyamide resin and disposed outside the reinforcing layer (see International Patent Application Publication No. WO 2018/155491).

The hydrogen transport component described in WO 2018/155491 does not have sufficient impact pressure resistance at high temperatures.

SUMMARY

The present technology provides a fluid transport hose excellent in fatigue resistance at low temperatures and impact pressure resistance at high temperatures.

The inventors of the present technology have found that, in a thermoplastic resin composition including a continuous phase containing a thermoplastic resin and a dispersed phase containing an elastomer, crosslinking the elastomer in the dispersed phase can suppress a decrease in elastic modulus at a high temperature, and thus have completed the present technology.

The present technology is a fluid transport hose including an inner layer including a thermoplastic resin composition containing a thermoplastic resin and an elastomer, a reinforcing layer disposed on an outer side of the inner layer, and an outer layer disposed on an outer side of the reinforcing layer, the thermoplastic resin composition having a storage modulus $E'_L$ at $-40°$ C. and a storage modulus $E'_H$ at $80°$ C. satisfying Formulas (1), (2), and (3):

$$E'_L \leq 1500 \text{ MPa} \quad (1)$$

$$E'_H \geq 40 \text{ MPa} \quad (2)$$

$$E'_H/E'_L \geq 0.05 \quad (3).$$

The present technology includes the following embodiments.

[1] A fluid transport hose including an inner layer including a thermoplastic resin composition containing a thermoplastic resin and an elastomer, a reinforcing layer disposed on an outer side of the inner layer, and an outer layer disposed on an outer side of the reinforcing layer, the thermoplastic resin composition having a storage modulus $E'_L$ at $-40°$ C. and a storage modulus $E'_H$ at $80°$ C. satisfying Formulas (1), (2), and (3):

$$E'_L \leq 1500 \text{ MPa} \quad (1)$$

$$E'_H \geq 40 \text{ MPa} \quad (2)$$

$$E'_H/E'_L \geq 0.05 \quad (3).$$

[2] The fluid transport hose according to [1], wherein the thermoplastic resin composition includes a continuous phase containing a thermoplastic resin and a dispersed phase containing an elastomer, and at least a part of the elastomer is crosslinked.

[3] The fluid transport hose according to [1] or [2], wherein the thermoplastic resin composition has an oxygen permeability coefficient at $21°$ C. and 50% relative humidity of 0.1 mm·cc/(m²·day·mmHg) or less.

[4] The fluid transport hose according to any one of [1] to [3], wherein the thermoplastic resin is at least one selected from the group consisting of a polyamide resin, a vinyl alcohol resin, and a polyester resin.

[5] The fluid transport hose according to any one of [1] to [4], wherein the elastomer is at least one selected from the group consisting of an olefin elastomer, a styrene elastomer, a butyl elastomer, a diene rubber, and a modified product thereof.

[6] The fluid transport hose according to any one of [1] to [5], wherein a ratio $V/V_0$ between a volume V of the thermoplastic resin composition when the thermoplastic resin composition is exposed under a hydrogen atmosphere at $30°$ C. and a pressure of 90 MPa for 24 hours and the pressure is reduced to atmospheric pressure and a volume $V_0$ before the exposure is less than 1.08.

[7] The fluid transport hose according to any one of [1] to [6], wherein the thermoplastic resin composition has a hydrogen dissolution amount of 3000 parts by mass or less when the thermoplastic resin composition is exposed under a hydrogen atmosphere at $30°$ C. and a pressure of 90 MPa for 24 hours.

[8] The fluid transport hose according to any one of [1] to [7], wherein the thermoplastic resin composition has a number of times at break of 2,000,000 or more in repeating elongation at a temperature of $-35°$ C., a strain of 18%, and a frequency of 6.7 Hz.

[9] The fluid transport hose according to any one of [1] to [8], wherein the outer layer has a 10% modulus at $25°$ C. of 10 MPa or less.

[10] The fluid transport hose according to any one of [1] to [9], wherein the reinforcing layer contains an organic fiber or a steel wire having a tensile modulus of 100 GPa or more.

The fluid transport hose according to an embodiment of the present technology is excellent in fatigue resistance at low temperatures and impact pressure resistance at high temperatures.

DETAILED DESCRIPTION

The present technology relates to a fluid transport hose. Examples of the fluid to be transported include, but are not limited to, hydrogen, a refrigerant for air conditioners, an inert gas, a fuel, oil, and water. In particular, the fluid transport hose of the present technology is suitable for a hydrogen hose.

The fluid transport hose according to an embodiment of the present technology includes an inner layer including a thermoplastic resin composition containing a thermoplastic resin and an elastomer, a reinforcing layer disposed on an outer side of the inner layer, and an outer layer disposed on outer side of the reinforcing layer.

In the fluid transport hose according to an embodiment of the present technology, the thermoplastic resin composition has a storage modulus $E'_L$ at $-40°$ C. and a storage modulus $E'_H$ at $80°$ C. satisfying Formulas (1), (2) and (3):

$$E'_L \leq 1500 \text{ MPa} \quad (1)$$

$$E'_H \geq 40 \text{ MPa} \quad (2)$$

$$E'_H/E'_L \geq 0.05 \quad (3).$$

The storage modulus $E'_L$ at −40° C. of the thermoplastic resin composition satisfies $$E'_L \leq 1500 \text{ MPa} \quad (1),$$

preferably satisfies $$20 \text{ MPa} \leq E'_L \leq 1450 \text{ MPa} \quad (1'),$$

and more preferably satisfies $$50 \text{ MPa} \leq E'_L \leq 1400 \text{ MPa} \quad (1'').$$

$E'_L$ satisfying the above formulas allows the thermoplastic resin composition to have excellent fatigue resistance at low temperatures.

Examples of a method for causing $E'_L$ to satisfy the above formulas include selecting the types of the thermoplastic resin and the elastomer, adjusting the composition ratio, and adding a plasticizer or a softener.

The storage modulus $E'_H$ at 80° C. of the thermoplastic resin composition satisfies $$40 \text{ MPa} \leq E'_H \quad (2),$$

preferably satisfies $$45 \text{ MPa} \leq E'_H \leq 1000 \text{ MPa} \quad (2'),$$

and more preferably satisfies $$50 \text{ MPa} \leq E'_H \leq 800 \text{ MPa} \quad (2'').$$

With $E'_H$ satisfying the above formulas, the impact pressure resistance at high temperatures is excellent, and breakage does not occur in crimping.

Examples of a method for causing $E'_H$ to satisfy the above formulas include selecting the types of the thermoplastic resin and the elastomer, adjusting the composition ratio, and adding a fiber or a filler.

The ratio ($E'_H/E'_L$) between the storage modulus at 80° C. and the storage modulus at −40° C. satisfies $0.05 \leq E'_H/E'_L$ ... (3), preferably satisfies $0.06 \leq E'_H/E'_L \leq 0.30$ ... (3'), and more preferably satisfies $0.07 \leq E'_H/E'_L \leq 0.25$ ... (3'').

When $E'_H/E'_L$ satisfies the above formulas, the temperature dependence of the elastic modulus is small and the rigidity of the hose is hardly affected by the use temperature, and thus, stable handleability can be obtained.

Examples of a method for causing $E'_H/E'_L$ to satisfy the above formulas include selecting the types of the thermoplastic resin and the elastomer, adjusting the composition ratio, and using an additive.

The storage modulus E' refers to a real part of a complex modulus obtained from stress-strain characteristics when dynamic strain is applied to a viscoelastic member, and corresponds to an elastic term of viscoelasticity.

The dynamic storage modulus can be determined in accordance with the method described in JIS (Japanese Industrial Standard) K7198. Specifically, the dynamic storage modulus may be determined as a constant of a real part of a complex modulus obtained by measuring stress and displacement when applying, to a sample subjected to an initial elongation, dynamic strain of a sine wave which is a periodic vibration. In the present technology, the measurement was performed with an initial elongation of 5%, a frequency of 20 Hz, and a dynamic strain of 0.10%.

The inner layer of the fluid transport hose contains a thermoplastic resin composition containing a thermoplastic resin and an elastomer.

The thermoplastic resin composition preferably contains a continuous phase containing a thermoplastic resin and a dispersed phase containing an elastomer. In other words, the thermoplastic resin forms the continuous phase (matrix), and the elastomer forms the dispersed phase (domain). That is, the thermoplastic resin composition preferably has a sea-island structure. The thermoplastic resin composition, because of having the sea-island structure, is likely to have fatigue resistance at low temperatures while suppressing permeation of a fluid transported.

The thermoplastic resin is not limited as long as the effect of the present technology is exhibited, but it is preferably at least one selected from the group consisting of a polyamide resin, a vinyl alcohol resin, and a polyester resin.

Examples of the polyamide resin include polyamide 11, polyamide 12, polyamide 6, a polyamide 6/66 copolymer, polyamide 610, a polyamide 6/12 copolymer, polyamide 1010, and poly amide 1012. Poly amide 11, polyamide 12, or polyamide 1012 is preferred.

Examples of the vinyl alcohol resin include a poly(vinyl alcohol) (PVA), an ethylene-vinyl alcohol copolymer (EVOHs), an ethylene-vinyl acetate-vinyl alcohol copolymer, and an ethylene-butene diol copolymer. Among them, an ethylene-vinyl alcohol copolymer is preferred. The melting point and oxygen permeability coefficient of the ethylene-vinyl alcohol copolymer vary depending on the copolymerization ratio of ethylene and vinyl alcohol. A preferred copolymerization ratio of ethylene is from 25 to 48 mol %. Among these, an ethylene-vinyl alcohol copolymer with a copolymerization ratio of ethylene of 48 mol % or an ethylene-vinyl alcohol copolymer with a copolymerization ratio of ethylene of 38 mol % is preferred.

Examples of the polyester resin include polyethylene terephthalate, polybutylene terephthalate, polyethylene naphthalate, and polybutylene naphthalate. Polybutylene terephthalate is preferred.

The continuous phase may contain a thermoplastic resin other than the polyamide resin, the vinyl alcohol resin, and the polyester resin, and various additives as long as the effect of the present technology is not impaired.

The elastomer is not limited as long as the effect of the present technology is exhibited, but it is preferably at least one selected from the group consisting of an olefin elastomer, a styrene elastomer, a butyl elastomer, a diene rubber, and a modified product thereof.

Examples of the olefin elastomer include an ethylene-α-olefin copolymer, an ethylene-unsaturated carboxylic acid copolymer, and a derivative thereof. Examples of the ethylene-α-olefin copolymer include an ethylene-propylene copolymer, an ethylene-butene copolymer, an ethylene-pentene copolymer, an ethylene-hexene copolymer, an ethylene-octene copolymer, and an acid-modified product thereof. Examples of the ethylene-unsaturated carboxylic acid copolymer include an ethylene-acrylic acid copolymer and an ethylene-methacrylic acid copolymer.

Examples of the styrene elastomer include a styrene-butadiene-styrene block copolymer (SBS), a styrene-isoprene-styrene block copolymer (SIS), a styrene-ethylene/propylene-styrene copolymer (SEPS), a styrene-ethylene/butylene-styrene block copolymer (SEBS), a styrene-butadiene-styrene copolymer (SBS), a styrene-isobutylene-styrene block copolymer (SIBS), and a maleic anhydride-modified product thereof, and among these, a styrene-isobutylene-styrene block copolymer (SIBS) and a maleic anhydride-modified styrene-ethylene/butylene-styrene block copolymer are preferred.

Examples of the butyl elastomer include an isobutylene-isoprene copolymer (IIR) and a halide thereof, and a styrene-isobutylene-styrene copolymer (SIBS) and a modified product thereof, and among these, a styrene-isobutylene-styrene copolymer is preferred.

Examples of the diene rubber include a natural rubber (NR), an isoprene rubber (IR), a butadiene rubber (BR) (high-cis BR and low-cis BR), a styrene butadiene rubber (SBR) (emulsion-polymerized SBR, solution-polymerized SBR), a chloroprene rubber (CR), an acrylonitrile butadiene rubber (NBR), an epoxidized natural rubber, and a hydrogenated product thereof, and a natural rubber, an isoprene rubber, a butadiene rubber, a styrene butadiene rubber, a chloroprene rubber, or an acrylonitrile butadiene rubber is preferred.

It is preferable that at least a part of the elastomer is crosslinked. Crosslinking at least a part of the elastomer can suppress a decrease in elastic modulus of the thermoplastic resin composition at high temperatures and allows the thermoplastic resin composition to have excellent impact pressure resistance at high temperatures. Examples of a method for crosslinking at least a part of the elastomer include dynamic crosslinking in which a crosslinking agent capable of crosslinking the elastomer is added when the thermoplastic resin and the elastomer are melt kneaded. As the crosslinking agent, a compound having a plurality of amino groups in one molecule is preferable, and in particular, diamines such as 3,3'-diaminodiphenyl sulfone (3,3'-DAS), 4,4'-diaminodiphenyl sulfone (4,4'-DAS), and N-phenyl-N'-(1,3-dimethylbutyl)-p-phenylenediamine (6PPD) are preferred.

The dispersed phase may contain an elastomer other than the olefin elastomer, the styrene elastomer, the butyl elastomer, the diene rubber, and a modified product thereof, and various additives as long as the effect of the present technology is not impaired.

The content of the thermoplastic resin in the thermoplastic resin composition constituting the inner layer is preferably 10 to 97 mass %, more preferably 15 to 95 mass %, and still more preferably 20 to 93 mass % of all the polymer components in the thermoplastic resin composition. When the content of the thermoplastic resin is too small, it is difficult to suppress permeation of fluids, and when the content is too large, fatigue resistance at low temperatures tends to be insufficient.

The content of the elastomer in the thermoplastic resin composition constituting the inner layer is preferably 3 to 85 mass %, more preferably 5 to 80 mass %, and still more preferably 7 to 75 mass % of all the polymer components in the thermoplastic resin composition. When the content of the elastomer is too small, fatigue resistance at low temperatures tends to be insufficient, and when the content is too large, it is difficult to suppress permeation of fluids and it is difficult to balance impact pressure resistance at high temperatures.

The volume ratio between the continuous phase and the dispersed phase in the thermoplastic resin composition constituting the inner layer is preferably 95:5 to 25:75, more preferably 92:8 to 28:72, and still more preferably 90:10 to 30:70. When the volume ratio between the continuous phase and the dispersed phase is in the above numerical ranges, fluid permeation resistance, fatigue resistance at low temperatures, and impact pressure resistance at high temperatures tend to be balanced.

The thermoplastic resin composition constituting the inner layer preferably has an oxygen permeability coefficient at 21° C. and 50% relative humidity of 0.1 mm·cc/(m²·day·mmHg) or less, more preferably 0.00001 to 0.08 mm·cc/(m²·day·mmHg), and still more preferably 0.0001 to 0.06 mm·cc/(m²·day·mmHg). With the oxygen permeability coefficient in these numerical ranges, the thermoplastic resin composition can be applied as a material for an inner layer of a fluid transport hose such as a hydrogen hose or an air conditioner hose. Examples of a method for adjusting the oxygen permeability coefficient within these numerical ranges include selecting the types of the thermoplastic resin and the elastomer and adjusting the composition ratio.

The ratio $V/V_0$ between the volume V when the thermoplastic resin composition constituting the inner layer is exposed to a hydrogen atmosphere at 30° C. under a pressure of 90 MPa for 24 hours and the pressure is reduced to atmospheric pressure and the volume $V_0$ before the exposure is preferably less than 1.08, more preferably 1.00 to 1.07, and still more preferably 1.00 to 1.06. When $V/V_0$ is in these ranges, in a case where a fluid having a small molecular size such as hydrogen or helium is transported at a high pressure, the dimensional change at the time of decompression is small, and generation of a fracture origin due to the inner layer biting into the reinforcing layer can be suppressed.

The hydrogen dissolution amount when the thermoplastic resin composition constituting the inner layer is exposed to a hydrogen atmosphere at 30° C. under a pressure of 90 MPa for 24 hours is preferably 3000 ppm by mass or less, more preferably 2800 ppm by mass or less, and still more preferably 2600 ppm by mass or less. When the hydrogen dissolution amount is in these ranges, in a case where a fluid having a small molecular size such as hydrogen or helium is transported at a high pressure, the number of fluid molecules remaining in the inner layer is small, and breakage due to expansion inside the inner layer at the time of decompression can be suppressed.

The thermoplastic resin composition constituting the inner layer has a number of times of repeated elongation at break of preferably 2,000,000 or more, more preferably 2,500,000 or more, and still more preferably 3,000,000 or more in repeated elongation at a temperature of −35° C., a strain of 18%, and a frequency of 6.7 Hz. With the number of times at break being equal to or more than these values, the thermoplastic resin composition has excellent fatigue resistance at low temperatures. Examples of a method for setting the number of times at break to these numerical values or more include selecting the types of the thermoplastic resin and the elastomer, adjusting the composition ratio, and adding a component capable of reinforcing the interface between the thermoplastic resin and the elastomer.

The method for producing the thermoplastic resin composition constituting the inner layer is not limited as long as the effect of the present technology is exhibited, and the thermoplastic resin composition may be produced, for example, by melt-kneading a thermoplastic resin, an elastomer, and optionally a crosslinking agent.

The thickness of the inner layer is preferably 0.2 to 2.0 mm, more preferably 0.3 to 1.8 mm, and still more preferably 0.4 to 1.6 mm. When the thickness of the inner layer is too small, the melt extrusion may become difficult or the extrusion method may be limited, and when the thickness is too large, the flexibility of the hose may become insufficient and the handleability may become poor.

The fluid transport hose includes a reinforcing layer disposed on an outer side of the inner layer. The reinforcing layer is a layer provided between the inner layer and the outer layer, and it is usually composed of a braided layer or a spiral layer formed by braiding metal wires or organic fibers. Examples of the metal wire include steel wires, wires of copper or a copper alloy, wires of aluminum or an aluminum alloy, wires of a magnesium alloy, and wires of titanium or a titanium alloy, and a steel wire is preferred. The wire diameter of the metal wire is preferably 0.25 to 0.40 mm. Examples of the organic fiber include polyparaphenylene benzobisoxazole (PBO) fibers, aramid fibers, and carbon fibers, and a PBO fiber is preferable. The diameter of the organic fiber is preferably 0.25 to 0.30 mm.

The reinforcing layer preferably contains an organic fiber or a steel wire having a tensile modulus of 100 GPa or more. The reinforcing layer containing organic fibers or steel wires having a tensile modulus of 100 GPa or more can makes it possible to reduce deformation of the hose even when a high internal pressure is applied. The tensile modulus of the organic fiber or steel wire is more preferably 150 GPa or more.

The fluid transport hose includes an outer layer disposed on an outer side of the reinforcing layer.

The 10% modulus of the outer layer at 25° C. is preferably 10 MPa or less, more preferably 0.1 to 9 MPa, and still more preferably 0.2 to 8 MPa. When the 10% modulus is in these numerical ranges, the outer layer is less likely to be damaged even when rubbed or contacted during use, and bending rigidity can be lowered, and thus, handleability of the hose is improved.

Examples of the material constituting the outer layer include, but are not limited to, a thermoplastic elastomer and a vulcanized rubber, and a thermoplastic elastomer is preferred. Preferable examples of the thermoplastic elastomer include, but are not limited to, a polyester elastomer, a polyamide elastomer, and a polyurethane elastomer.

The polyester elastomer (TPEE) is a thermoplastic elastomer having a hard segment of polyester (e.g., poly(butylene terephthalate)) and a soft segment of polyether (e.g., poly(tetramethylene glycol)) or polyester (e.g., aliphatic polyester). Polyester elastomers are commercially available, and a commercially available product thereof can be used in embodiments of the present technology. Examples of the commercially available product of the polyester elastomer include "PELPRENE"®, available from Toyobo Co., Ltd., and "Hytrel"®, available from Du Pont-Toray Co., Ltd.

The polyamide elastomer (TPA) is a thermoplastic elastomer having a hard segment of polyamide (e.g., polyamide 6, polyamide 66, poly amide 11, or polyamide 12) and a soft segment of polyether (e.g., polyethylene glycol or polypropylene glycol). Poly amide elastomers are commercially available, and a commercially available product thereof can be used in embodiments of the present technology. Examples of the commercially available product of the polyamide elastomer include "UBESTA XPA"®, available from Ube Industries, Ltd., and "PEBAX"®, available from Arkema K.K.

The polyurethane elastomer is a block copolymer containing a hard segment having a urethane bond and a soft segment of polyether, polyester, polycarbonate, or the like. Polyurethane elastomers are commercially available, and a commercially available product thereof can be used in embodiments of the present technology. Examples of the commercially available product of the polyurethane elastomer include "Elastollan"® available from BASF, "Miractran"® available from Nippon Miractran Co., Ltd., and "Resamine" (trade name) available from Dainichiseika Color & Chemicals Mfg. Co., Ltd.

The thickness of the outer layer is preferably 0.2 to 1.2 mm, more preferably 0.3 to 1.0 mm, and still more preferably 0.4 to 0.8 mm. When the thickness of the outer layer is too small, the outer layer tends to be broken by rubbing, deformation, impact, or the like during handling of the hose, and there is a possibility that the reinforcing layer cannot be sufficiently protected. When the thickness is too large, the weight of the hose increases, and the handleability deteriorates.

The method for producing the fluid transport hose is not particularly limited, and the fluid transport hose can be produced as follows. First, an inner layer (inner tube) is extruded into a tube shape by extrusion molding, next, fibers that serve as a reinforcing layer are braided on the tube, and then an outer layer (outer tube) is further covered on the fibers by extrusion molding.

The hose may be thus produced.

EXAMPLES

Raw Materials

The raw materials used in the following examples and comparative examples are as follows.

Thermoplastic Resin for Inner Layer

PA11: polyamide 11, "RILSAN"® BESN OTL, available from Arkema K.K.

PA12: polyamide 12, "UBESTA"® 3020U, available from Ube Industries, Ltd.

PA1010: polyamide 1010, "VESTAMID"® DS16, available from Daicel-Evonik Ltd.

PA610: polyamide 610, "Amilan"® CM2001, available from Toray Industries, Inc.

PA6/12: polyamide 6/12 copolymer, "UBE nylon" 7024B, available from Ube Industries, Ltd.

PA6/66: polyamide 6/66 copolymer, "UBEnylon" 5023B, available from Ube Industries, Ltd.

PA6: polyamide 6, "UBE nylon" 1013B, available from Ube Industries, Ltd.

EVOH: ethylene-vinyl alcohol copolymer, "Soarnol"® H4815B, available from Mitsubishi Chemical Corporation Elastomer for Inner Layer Acid-modified EBR-1: maleic anhydride-modified ethylene-1-butene copolymer, "TAFMER"® MH7010, available from Mitsui Chemicals, Inc.

Acid-modified EBR-2: maleic anhydride-modified ethylene-1-butene copolymer, "TAFMER"® MH5020, available from Mitsui Chemicals, Inc.

Acid-modified SEBS: maleic anhydride-modified styrene-ethylene/butylene-styrene block copolymer, "Tuftec"® M1943, available from Asahi Kasei Corporation Acid-modified SBS: maleic anhydride-modified styrene-butadiene-styrene block copolymer, "Tufprene"® 912, available from Asahi Kasei Corporation Br-IPMS: brominated isobutylene-para-methylstyrene copolymer, "EXXPRO"® 3745, available from ExxonMobil Chemical Company Crosslinking agent 3,3'-DAS: 3,3'-diaminodiphenyl sulfone, available from Mitsui Fine Chemicals, Inc.

4,4'-DAS: 4,4'-diaminodiphenyl sulfone, available from Mitsui Fine Chemicals, Inc.

6PPD: N-phenyl-N'-(1,3-dimethylbutyl)-p-phenylenediamine, "Santoflex"®, available from FLEXSYS Outer Layer Material TPEE: thermoplastic polyester elastomer, "Hytrel"® 4057N, available from Du Pont-Toray Co., Ltd. (10% modulus at 25° C.=3.9 MPa)

(1) Preparation of Thermoplastic Resin Composition

In a twin screw extruder (available from The Japan Steel Works, Ltd.) in which the cylinder temperature was set to 220° C., the thermoplastic resin, the elastomer, and the crosslinking agent were introduced in the formulations listed in Tables 1 to 3 and melt-kneaded for a residence time of about 5 minutes, then the melt-kneaded product was extruded in a strand form through a die attached to a discharge port. The resulting strand-shaped extruded product was pelletized using a pelletizer for resin to obtain a pellet-shaped thermoplastic resin composition.

(2) Production of Hose

The pellet-shaped thermoplastic resin composition prepared in the procedure (1) was extruded into a tube shape having an inner diameter of 9 mm and a thickness of 1 mm. This tube was used as an inner layer, and as a reinforcing layer, a PBO fiber was braided to form three layers on the outer side of the inner layer, and a steel wire was braided to form one layer on the outer side of the PBO layers. Further, a thermoplastic polyester elastomer ("Hytrel"®4057N, available from Du Pont-Toray Co., Ltd.) was extruded on the outer side of the reinforcing layer to have a thickness of 0.7 mm as an outer layer, whereby a hose was produced.

For the thermoplastic resin composition (inner layer material) prepared in the procedure (1), the storage modulus at −40° C. ($E'_L$), the storage modulus at 80° C. ($E'_H$), the oxygen permeability coefficient, and the fatigue resistance at a low temperature (−35° C.) were measured, the 10% modulus of the thermoplastic polyester elastomer of the outer layer material was measured, and the impact pressure resistance at a low temperature (−40° C.) and a high temperature (80° C.) of the hose produced in the above procedure (2) was evaluated. The results are shown in Tables 1 to 3.

The measurement or evaluation method of each measurement or evaluation item is as follows.

Measurement of Storage Modulus E' of Thermoplastic Resin Composition (Inner Layer Material)

The pellet-shaped thermoplastic resin composition prepared in the procedure (1) was formed into a sheet having an average thickness of 0.2 mm by using a 40 mmØ single screw extruder with a 550 mm wide T-die (PLA GIKEN Co., Ltd.) under the conditions of temperatures of the cylinder and the die set to a temperature that is 20° C. higher than the melting point of the material having the highest melting point in the composition, a cooling roll temperature of 50° C., and a take-up speed of 3 m/min.

This sheet was cut into a strip having a predetermined size, and the dynamic storage modulus of the strip was measured in accordance with the method described in JIS K7198 at an initial elongation of 5%, a frequency of 20 Hz, and a dynamic strain of 0.10%.

Measurement of Oxygen Permeability Coefficient of Thermoplastic Resin Composition (Inner Layer Material)

In the same manner as in the above-described "Measurement of storage modulus E' of thermoplastic resin composition (inner layer material)", the thermoplastic resin composition (inner layer material) was formed into a sheet having an average thickness of 0.2 mm.

The sheet was cut into a predetermined size, and the oxygen permeability coefficient was measured by using an OX-TRAN 1/50 available from MOCON under the conditions of a temperature of 21° C. and a relative humidity of 50%.

Measurement of Volume Change Rate of Inner Layer Material Due to Hydrogen Exposure The pellet-shaped thermoplastic resin composition prepared in the procedure (1) was formed into a sheet having an average thickness of 1.0 mm by using a 40 mmØ single screw extruder with a 200 mm wide T-die (PLA GIKEN Co., Ltd.) under the conditions of temperatures of the cylinder and the die set to a temperature that is 20° C. higher than the melting point of the material having the highest melting point in the composition, a cooling roll temperature of 50° C., and a take-up speed of 1 m/min. This sheet was cut into a disk shape having a diameter of 13 mm, placed in a pressure-resistant vessel, and subjected to hydrogen exposure at 30° C. and 90 MPa for 24 hours. Immediately after the pressure was reduced to atmospheric pressure, the area of the disk-shaped sample was measured with a Keyence two-dimensional multi-point sizer TM-3000, and the volume change rate was calculated. The volume decreased with the release of hydrogen, and a value obtained by dividing the largest volume (maximum value) in the process by the volume before exposure measured in the same manner was defined as the volume change rate. With the volume change rate of 1.08 or more, repeating transportation of hydrogen with the hose causes the inner layer to bite into the reinforcing layer due to volume change, and the durability degrades.

Measurement of Hydrogen Dissolution Amount of Inner Layer Material Due to Hydrogen Exposure In the same manner as in the above-described "Measurement of volume change of inner layer material due to hydrogen exposure", the disc was subjected to hydrogen exposure at 30° C. and 90 MPa for 24 hours, and immediately after the pressure was reduced to atmospheric pressure, the disk was allowed to stand in a tube filled with nitrogen at 30° C., gas in the tube was introduced into gas chromatography at certain time intervals from an end of the tube, hydrogen released from the inside of the sample was detected, measurement was continued until hydrogen was not detected, and the amount of hydrogen detected was integrated to determine the amount of hydrogen dissolved in the sample by exposure.

Measurement of Fatigue Resistance of Thermoplastic Resin Composition (Inner Layer Material) at Low Temperatures In the same manner as in the above-described "Measurement of storage modulus E' of thermoplastic resin composition (inner layer material)", the composition was formed into a sheet having an average thickness of 0.2 mm, and from the sheet, 20 strips of 5 mm width and 200 mm length were cut out. The strips were subjected to repeating elongation deformation using a constant strain constant load fatigue tester available from Ueshima Seisakusho Co., Ltd. under the conditions of a temperature of −35° C., a strain of 18%, and a speed of 6.7 Hz. The number of times when 12 (60%) of the 20 strips were broken was defined as the number of times at break. A larger number of times at break is more advantageous and preferable with respect to repeating deformation at a low temperature. The sample with the number of times at break of less than 2,000,000 was determined as "Poor", the sample with the number of times at break of 2,000,000 or more and less than 5,000,000 was determined as "Good", and the sample with the number of times at break of 5,000,000 or more was determined as "Excellent".

Measurement of 10% Modulus of Outer Layer Material

The thermoplastic polyester elastomer was formed into a sheet having an average thickness of 0.2 mm by using a 40 mmØ single screw extruder with a 550 mm wide T-die (PLA GIKEN Co., Ltd.) under the conditions of temperatures of the cylinder and the die set to 230° C., a cooling roll temperature of 50° C., and a take-up speed of 3 m/min. The sheet was punched into a JIS No. 3 dumbbell shape, and a tensile test was performed in accordance with JIS K6301 "Physical Testing Methods for Vulcanized Rubber" at a temperature of 25° C. and a tensile speed of 500 mm/min. The stress at 10% elongation (10% modulus) was determined from the resulting stress-strain curve.

Evaluation of Impact Pressure Resistance of Hose

In accordance with JIS K6330-8 "Testing methods for rubber and plastics hoses—Part 8: Hydraulic-pressure impulse test without flexing", a fluid was circulated in the hose fixed in a U-shape, and a pressure in a shock wave of 90 MPa was applied 100,000 times or until the hose was broken at a frequency of 1 Hz and a pressurization speed of 50 MPa/s. After the completion of the test, the hose with no breakage of the inner layer was evaluated as "Good", and the hose with breakage of the inner layer was evaluated as "Poor".

The test of impact pressure resistance ala low temperature (−40° C.) was performed using nitrogen gas cooled to −40° C. as the fluid.

The test of impact pressure resistance at a high temperature (80° C.) was performed using oil at 80° C. as the fluid.

TABLE 1

| | | | | Comparative Example 1 | Comparative Example 2 | Example 1 | Example 2 |
|---|---|---|---|---|---|---|---|
| Inner layer | Thermoplastic resin | PA11 | Parts by mass | 70 | 70 | 70 | 85 |
| | | PA12 | Parts by mass | | | | |
| | Elastomer | Acid-modified EBR-1 | Parts by mass | 30 | | 30 | 15 |
| | | Acid-modified EBR-2 | Parts by mass | | | | |
| | | Acid-modified SEBS | Parts by mass | | 30 | | |
| | | Acid-modified SBS | Parts by mass | | | | |
| | | Br-IPMS | Parts by mass | | | | |
| | Crosslinking agent | 3,3'-DAS | Parts by mass | | | 1 | 0.5 |
| | | 4,4'-DAS | Parts by mass | | | | |
| Reinforcing layer | | | | Three layers of PBO + one layer of steel wire | | | |
| Outer layer | | | | TPEE | | | |
| $E'_L$ of inner layer material | | | MPa | 943 | 977 | 1013 | 1230 |
| $E'_H$ of inner layer material | | | MPa | 20 | 36 | 102 | 142 |
| $E'_H/E'_L$ of inner layer material | | | | 0.021 | 0.037 | 0.101 | 0.115 |
| Oxygen permeability coefficient of inner layer material | | | mm · cc/(m² · day · mmHg) | 0.043 | 0.046 | 0.044 | 0.023 |
| Volume change rate of inner layer material due to hydrogen exposure | | | | 1.09 | 1.05 | 1.07 | 1.03 |
| Hydrogen dissolution amount of inner layer material due to hydrogen exposure | | | ppm by mass | 2280 | 2050 | 2270 | 1760 |
| Fatigue resistance of inner layer material at low temperature | | | | Excellent | Excellent | Excellent | Excellent |
| Impact pressure resistance of hose at −40° C. | | | | Good | Good | Good | Good |
| Impact pressure resistance of hose at 80° C. | | | | Poor | Poor | Good | Good |

| | | | | Example 3 | Example 4 | Example 5 | Example 6 |
|---|---|---|---|---|---|---|---|
| Inner layer | Thermoplastic resin | PA11 | Parts by mass | 55 | 70 | 85 | 55 |
| | | PA12 | Parts by mass | | | | |
| | Elastomer | Acid-modified EBR-1 | Parts by mass | 45 | | | |
| | | Acid-modified EBR-2 | Parts by mass | | | | |
| | | Acid-modified SEBS | Parts by mass | | 30 | 15 | 45 |
| | | Acid-modified SBS | Parts by mass | | | | |
| | | Br-IPMS | Parts by mass | | | | |

TABLE 1-continued

|  |  |  | | | | | |
|---|---|---|---|---|---|---|---|
| Crosslinking agent | 3,3'-DAS | Parts by mass | 1.5 | 1 | 0.5 | 1.5 |
|  | 4,4'-DAS | Parts by mass | | | | |
| Reinforcing layer | | | colspan="4" Three layers of PBO + one layer of steel wire | | | |
| Outer layer | | | colspan="4" TPEE | | | |
| E'$_L$ of inner layer material | | MPa | 753 | 1040 | 1251 | 773 |
| E'$_H$ of inner layer material | | MPa | 67 | 110 | 147 | 75 |
| E'$_H$/E'$_L$ of inner layer material | | | 0.089 | 0.106 | 0.118 | 0.097 |
| Oxygen permeability coefficient of inner layer material | | mm · cc/(m² · day · mmHg) | 0.074 | 0.047 | 0.025 | 0.077 |
| Volume change rate of inner layer material due to hydrogen exposure | | | 1.08 | 1.03 | 1.01 | 1.05 |
| Hydrogen dissolution amount of inner layer material due to hydrogen exposure | | ppm by mass | 2640 | 2040 | 1650 | 2470 |
| Fatigue resistance of inner layer material at low temperature | | | Excellent | Excellent | Excellent | Excellent |
| Impact pressure resistance of hose at −40° C. | | | Good | Good | Good | Good |
| Impact pressure resistance of hose at 80° C. | | | Good | Good | Good | Good |

TABLE 2

|  |  |  |  | Comparative Example 3 | Example 7 | Example 8 |
|---|---|---|---|---|---|---|
| Inner layer | Thermoplastic resin | PA11 | Parts by mass | 30 | 70 | 70 |
|  |  | PA12 | Parts by mass | | | |
|  |  | PA1010 | Parts by mass | | | |
|  |  | PA610 | Parts by mass | | | |
|  |  | PA6/12 | Parts by mass | | | |
|  | Elastomer | Acid-modified SEBS | Parts by mass | 70 | 30 | |
|  |  | Acid-modified SBS | Parts by mass | | | 30 |
|  |  | Br-IPMS | Parts by mass | | | |
|  | Crosslinking agent | 3,3'-DAS | Parts by mass | 2 | | 1 |
|  |  | 4,4'-DAS | Parts by mass | | 1 | |
| Reinforcing layer | | | | Three layers of PBO + one layer of steel wire | | |
| Outer layer | | | | TPEE | | |
| E'$_L$ of inner layer material | | | MPa | 195 | 1052 | 1008 |
| E'$_H$ of inner layer material | | | MPa | 9 | 107 | 89 |
| E'$_H$/E'$_L$ of inner layer material | | | | 0.046 | 0.102 | 0.088 |
| Oxygen permeability coefficient of inner layer material | | | mm · cc/(m² · day · mmHg) | 0.122 | 0.047 | 0.048 |
| Volume change rate of inner layer material due to hydrogen exposure | | | | 1.28 | 1.03 | 1.04 |
| Hydrogen dissolution amount of inner layer material due to hydrogen exposure | | | ppm by mass | 3160 | 2030 | 2170 |
| Fatigue resistance of inner layer material at low temperature | | | | Excellent | Excellent | Excellent |
| Impact pressure resistance of hose at −40° C. | | | | Good | Good | Good |
| Impact pressure resistance of hose at 80° C. | | | | Poor | Good | Good |

TABLE 2-continued

|  |  |  |  | Example 9 | Example 10 | Example 11 | Example 12 |
|---|---|---|---|---|---|---|---|
| Inner layer | Thermoplastic resin | PA11 | Parts by mass |  |  |  |  |
|  |  | PA12 | Parts by mass | 70 |  |  |  |
|  |  | PA1010 | Parts by mass |  | 70 |  |  |
|  |  | PA610 | Parts by mass |  |  | 60 |  |
|  |  | PA6/12 | Parts by mass |  |  |  | 55 |
|  | Elastomer | Acid-modified SEBS | Parts by mass | 30 | 30 | 40 | 45 |
|  |  | Acid-modified SBS | Parts by mass |  |  |  |  |
|  |  | Br-IPMS | Parts by mass |  |  |  |  |
|  | Crosslinking agent | 3,3'-DAS | Parts by mass | 1 | 1 | 1 | 1 |
|  |  | 4,4'-DAS | Parts by mass |  |  |  |  |
| Reinforcing layer |  |  |  | Three layers of PBO + one layer of steel wire | | | |
| Outer layer |  |  |  | TPEE | | | |
| $E'_L$ of inner layer material |  |  | MPa | 987 | 1173 | 1266 | 1406 |
| $E'_H$ of inner layer material |  |  | MPa | 112 | 90 | 103 | 141 |
| $E'_H/E'_L$ of inner layer material |  |  |  | 0.113 | 0.077 | 0.081 | 0.100 |
| Oxygen permeability coefficient of inner layer material |  |  | mm · cc/(m² · day · mmHg) | 0.051 | 0.041 | 0.020 | 0.012 |
| Volume change rate of inner layer material due to hydrogen exposure |  |  |  | 1.04 | 1.02 | 1.04 | 1.05 |
| Hydrogen dissolution amount of inner layer material due to hydrogen exposure |  |  | ppm by mass | 2100 | 1980 | 2220 | 2340 |
| Fatigue resistance of inner layer material at low temperature |  |  |  | Excellent | Excellent | Excellent | Excellent |
| Impact pressure resistance of hose at −40° C. |  |  |  | Good | Good | Good | Good |
| Impact pressure resistance of hose at 80° C. |  |  |  | Good | Good | Good | Good |

TABLE 3

|  |  |  |  | Comparative Example 4 | Example 13 | Example 14 | Comparative Example 5 |
|---|---|---|---|---|---|---|---|
| Inner layer | Thermoplastic resin | PA6/12 | Parts by mass | 98 |  |  |  |
|  |  | PA6/66 | Parts by mass |  | 55 |  |  |
|  |  | PA6 | Parts by mass |  |  |  | 60 |
|  |  | EVOH | Parts by mass |  |  | 35 |  |
|  | Elastomer | Acid-modified EBR-1 | Parts by mass |  | 45 |  |  |
|  |  | Acid-modified EBR-2 | Parts by mass |  |  | 65 |  |
|  |  | Acid-modified SEBS | Parts by mass | 2 |  |  |  |
|  |  | Br-IPMS | Parts by mass |  |  |  | 40 |
|  | Crosslinking agent | 3,3'-DAS | Parts by mass | 0.2 | 1 | 2 | 1 |
| Reinforcing layer |  |  |  | Three layers of PBO + one layer of steel wire | | | |
| Outer layer |  |  |  | TPEE | | | |
| $E'_L$ of inner layer material |  |  | MPa | 2085 | 1370 | 810 | 1610 |
| $E'_H$ of inner layer material |  |  | MPa | 205 | 122 | 42 | 205 |

TABLE 3-continued

| | | Comparative Example 4 | Example 13 | Example 14 | Comparative Example 5 |
|---|---|---|---|---|---|
| $E'_H/E'_L$ of inner layer material | | 0.098 | 0.089 | 0.052 | 0.127 |
| Oxygen permeability coefficient of inner layer material | mm · cc/(m² · day · mmHg) | 0.003 | 0.007 | 0.0007 | 0.005 |
| Volume change rate of inner layer material due to hydrogen exposure | | 1.01 | 1.04 | 1.08 | 1.04 |
| Hydrogen dissolution amount of inner layer material due to hydrogen exposure | ppm by mass | 1330 | 2310 | 2530 | 2200 |
| Fatigue resistance of inner layer material at low temperature | | Poor | Excellent | Excellent | Poor |
| Impact pressure resistance of hose at −40° C. | | Poor | Good | Good | Poor |
| Impact pressure resistance of hose at 80° C. | | Good | Good | Good | Good |

INDUSTRIAL APPLICABILITY

The fluid transport hose according to an embodiment of the present technology can be suitably used as a fluid transport hose such as a hose for filling hydrogen gas into fuel cell vehicles and the like from a dispenser installed in a hydrogen station, or a refrigerant transport hose for air conditioners of vehicles.

The invention claimed is:

1. A fluid transport hose comprising: an inner layer comprising a thermoplastic resin composition containing a thermoplastic resin and an elastomer; a reinforcing layer disposed on an outer side of the inner layer; and an outer layer disposed on an outer side of the reinforcing layer, the thermoplastic resin composition having a storage modulus $E'_L$ at −40° C. and a storage modulus $E'_H$ at 80° C. satisfying Formulas (1), (2), and (3):

$$E'_L \leq 1500 \text{ MPa} \qquad (1)$$

$$E'_H \geq 40 \text{ MPa} \qquad (2)$$

$$E'_H/E'_L \geq 0.05 \qquad (3).$$

2. The fluid transport hose according to claim 1, wherein the thermoplastic resin composition comprises a continuous phase containing a thermoplastic resin and a dispersed phase containing an elastomer, and at least a part of the elastomer is crosslinked.

3. The fluid transport hose according to claim 1, wherein the thermoplastic resin composition has an oxygen permeability coefficient at 21° C. and 50% relative humidity of 0.1 mm·cc/(m²·day·mmHg) or less.

4. The fluid transport hose according to claim 1, wherein the thermoplastic resin is at least one selected from the group consisting of a polyamide resin, a vinyl alcohol resin, and a polyester resin.

5. The fluid transport hose according to claim 1, wherein the elastomer is at least one selected from the group consisting of an olefin elastomer, a styrene elastomer, a butyl elastomer, a diene rubber, and a modified product thereof.

6. The fluid transport hose according to claim 1, wherein a ratio $V/V_0$ between a volume V of the thermoplastic resin composition when the thermoplastic resin composition is exposed under a hydrogen atmosphere at 30° C. and a pressure of 90 MPa for 24 hours and the pressure is reduced to atmospheric pressure and a volume $V_0$ before the exposure is less than 1.08.

7. The fluid transport hose according to claim 1, wherein the thermoplastic resin composition has a hydrogen dissolution amount of 3000 parts by mass or less when the thermoplastic resin composition is exposed under a hydrogen atmosphere at 30° C. and a pressure of 90 MPa for 24 hours.

8. The fluid transport hose according to claim 1, wherein the thermoplastic resin composition has a number of times at break of 2,000,000 or more in repeating elongation at a temperature of −35° C., a strain of 18%, and a frequency of 6.7 Hz.

9. The fluid transport hose according to claim 1, wherein the outer layer has a 10% modulus at 25° C. of 10 MPa or less.

10. The fluid transport hose according to claim 1, wherein the reinforcing layer contains an organic fiber or a steel wire having a tensile modulus of 100 GPa or more.

11. The fluid transport hose according to claim 2, wherein the thermoplastic resin composition has an oxygen permeability coefficient at 21° C. and 50% relative humidity of 0.1 mm·cc/(m²·day·mmHg) or less.

12. The fluid transport hose according to claim 11, wherein the thermoplastic resin is at least one selected from the group consisting of a polyamide resin, a vinyl alcohol resin, and a polyester resin.

13. The fluid transport hose according to claim 12, wherein the elastomer is at least one selected from the group consisting of an olefin elastomer, a styrene elastomer, a butyl elastomer, a diene rubber, and a modified product thereof.

14. The fluid transport hose according to claim 13, wherein a ratio $V/V_0$ between a volume V of the thermoplastic resin composition when the thermoplastic resin composition is exposed under a hydrogen atmosphere at 30° C. and a pressure of 90 MPa for 24 hours and the pressure is reduced to atmospheric pressure and a volume $V_0$ before the exposure is less than 1.08.

15. The fluid transport hose according to claim 14, wherein the thermoplastic resin composition has a hydrogen dissolution amount of 3000 parts by mass or less when the thermoplastic resin composition is exposed under a hydrogen atmosphere at 30° C. and a pressure of 90 MPa for 24 hours.

16. The fluid transport hose according to claim 15, wherein the thermoplastic resin composition has a number of times at break of 2,000,000 or more in repeating elongation at a temperature of −35° C., a strain of 18%, and a frequency of 6.7 Hz.

17. The fluid transport hose according to claim 16, wherein the outer layer has a 10% modulus at 25° C. of 10 MPa or less.

18. The fluid transport hose according to claim 17, wherein the reinforcing layer contains an organic fiber or a steel wire having a tensile modulus of 100 GPa or more.

* * * * *